US010200258B2

(12) United States Patent
Mattson et al.

(10) Patent No.: US 10,200,258 B2
(45) Date of Patent: Feb. 5, 2019

(54) TRANSACTION INTEGRITY FOR NETWORK SERVICES CONFIGURATION

(71) Applicant: Juniper Networks, Inc., Sunnyvale, CA (US)

(72) Inventors: Geoffrey A. Mattson, Palo Alto, CA (US); Lei Qiu, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 386 days.

(21) Appl. No.: 14/460,320

(22) Filed: Aug. 14, 2014

(65) Prior Publication Data

US 2016/0050125 A1    Feb. 18, 2016

(51) Int. Cl.
*H04L 12/24* (2006.01)
*H04L 29/08* (2006.01)
(Continued)

(52) U.S. Cl.
CPC ...... *H04L 41/5051* (2013.01); *H04L 41/0806* (2013.01); *H04L 41/5054* (2013.01);
(Continued)

(58) Field of Classification Search
CPC ............. H04L 41/5051; H04L 41/5054; H04L 41/0806; H04L 41/0873; H04L 47/14; H04L 47/80; H04L 67/16
(Continued)

(56) References Cited

U.S. PATENT DOCUMENTS

| RE39,717 E * | 7/2007 | Yates ................ H04M 3/42136 |
| | | 707/999.104 |
| 7,327,673 B1 * | 2/2008 | Tang ..................... H04L 41/22 |
| | | 370/229 |

(Continued)

FOREIGN PATENT DOCUMENTS

| EP | 2472780 A1 | 4/2012 |
| WO | 2013102253 A1 | 7/2013 |
| WO | 2013184846 A1 | 12/2013 |

OTHER PUBLICATIONS

U.S. Appl. No. 61/867,297, filed Aug. 19, 2013.*

(Continued)

*Primary Examiner* — Philip J Chea
*Assistant Examiner* — Wing Ma
(74) *Attorney, Agent, or Firm* — Shumaker & Sieffert, P.A.

(57) ABSTRACT

In some examples, a controller provisions services for transporting packet flows within a network. A controller service provisioning module receives a service request that comprises a definition for a service to be provided by the network for a subscriber or a customer of the network. The service provisioning module determines a plurality of network resources of at least one network device to be configured to implement the service in the network and apply the service to the packet-based network traffic of the subscriber. A locking unit of the service provisioning module acquires a lock from a network-wide coordination repository that (Continued)

stores a software representation for each of the network resources, the lock providing exclusive configuration access to the service provisioning module for the network resources. The service provisioning module, only upon the locking unit acquiring the lock for the network resources, configures the network resources to provision the service.

21 Claims, 6 Drawing Sheets

(51) Int. Cl.
  *H04L 12/801* (2013.01)
  *H04L 12/927* (2013.01)
(52) U.S. Cl.
  CPC .............. *H04L 47/14* (2013.01); *H04L 47/80* (2013.01); *H04L 67/16* (2013.01); *H04L 41/0873* (2013.01)
(58) Field of Classification Search
  USPC ........................................................ 709/225
  See application file for complete search history.

(56) References Cited

U.S. PATENT DOCUMENTS

| | | | | |
|---|---|---|---|---|
| 7,349,913 | B2* | 3/2008 | Clark ................ | G06F 17/30174 |
| 7,403,988 | B1* | 7/2008 | Blouin ................ | H04L 12/2602 |
| | | | | 370/230 |
| 8,813,225 | B1* | 8/2014 | Fuller ................ | H04L 63/10 |
| | | | | 726/23 |
| 9,674,292 | B2* | 6/2017 | Fichtenholtz ........... | H04L 67/16 |
| 2003/0140177 | A1* | 7/2003 | Arajs ................ | G06F 9/526 |
| | | | | 719/315 |
| 2005/0114315 | A1* | 5/2005 | Tanner ................ | H04L 41/0813 |
| 2005/0204054 | A1* | 9/2005 | Wang ................ | G06F 9/5011 |
| | | | | 709/232 |
| 2006/0161554 | A1* | 7/2006 | Lucovsky ............ | G06F 21/335 |
| 2006/0271395 | A1* | 11/2006 | Harris ................ | G06F 9/52 |
| | | | | 718/1 |
| 2007/0061433 | A1* | 3/2007 | Reynolds ............ | H04L 12/2602 |
| | | | | 709/223 |
| 2008/0109870 | A1* | 5/2008 | Sherlock ............ | G06F 21/552 |
| | | | | 726/1 |
| 2009/0128319 | A1 | 5/2009 | Dholakia et al. | |
| 2010/0131644 | A1* | 5/2010 | Jeong ................ | H04W 40/24 |
| | | | | 709/224 |
| 2010/0291904 | A1* | 11/2010 | Musfeldt ............ | G06F 21/604 |
| | | | | 455/414.1 |
| 2011/0029673 | A1* | 2/2011 | Jaisinghani ............ | H04L 41/12 |
| | | | | 709/226 |
| 2011/0055810 | A1* | 3/2011 | DeHaan ............ | G06F 21/6272 |
| | | | | 717/120 |
| 2011/0302265 | A1* | 12/2011 | Singh ................ | H04L 61/1505 |
| | | | | 709/208 |
| 2012/0096158 | A1* | 4/2012 | Astete ................ | G06F 9/45533 |
| | | | | 709/225 |
| 2012/0158936 | A1* | 6/2012 | You ................ | H04L 47/782 |
| | | | | 709/223 |
| 2012/0278430 | A1* | 11/2012 | Lehane ............ | H04L 41/5054 |
| | | | | 709/217 |
| 2013/0091283 | A1* | 4/2013 | Omar ................ | H04L 41/0893 |
| | | | | 709/226 |
| 2013/0132854 | A1* | 5/2013 | Raleigh ................ | G06F 3/0482 |
| | | | | 715/738 |
| 2014/0075027 | A1* | 3/2014 | Chatterjee ........... | H04L 41/5041 |
| | | | | 709/225 |
| 2014/0082199 | A1* | 3/2014 | Johnson ................ | H04W 4/02 |
| | | | | 709/225 |
| 2014/0089474 | A1* | 3/2014 | Zenz ................ | H04L 41/0813 |
| | | | | 709/221 |
| 2014/0207927 | A1* | 7/2014 | Fichtenholtz ........... | H04L 67/16 |
| | | | | 709/223 |
| 2014/0355429 | A1* | 12/2014 | Smith ................ | H04W 28/0226 |
| | | | | 370/230 |
| 2014/0365549 | A1* | 12/2014 | Jenkins ................ | G06F 9/5077 |
| | | | | 709/201 |
| 2015/0019733 | A1* | 1/2015 | Suryanarayanan ........................ | |
| | | | | H04L 41/0806 |
| | | | | 709/226 |
| 2015/0089068 | A1* | 3/2015 | Islam ................ | H04L 47/741 |
| | | | | 709/226 |
| 2015/0212840 | A1* | 7/2015 | Biran ................ | G06F 9/45558 |
| | | | | 718/1 |
| 2015/0319226 | A1* | 11/2015 | Mahmood ........... | H04L 43/0817 |
| | | | | 709/201 |
| 2015/0365288 | A1* | 12/2015 | Van Der Merwe ........................ | |
| | | | | H04L 41/5051 |
| | | | | 370/254 |
| 2016/0043970 | A1* | 2/2016 | Jacob ................ | H04L 67/16 |
| | | | | 709/226 |

OTHER PUBLICATIONS

U.S. Appl. No. 61/880,784—Provisional Application.*
Extended Search Report from counterpart European Application No. 15180500.9, dated Dec. 18, 2015, 4 pp.
Atlas et al., "Interface to the Routing System Framework," draft-ward-irs-framwork-00, Network Working Group, Internet-Draft, Informational, Jul. 30, 2012, 22 pp.
"JunosE Software for E Series Broadband Services Routers," Juniper Networks, Release 14.1.x, Dec. 16, 2012, 814 pp.
Vasseur et al., "Path Computation Element (PCE) Communication Protocol (PCEP)," Network Working Group, RFC 5440, Standards Track, Mar. 2009, 88 pp.
Bjorklund et al., "YANG—A Data Modeling Language for the Network Configuration Protocol (NETCONF)," Internet Engineering Task Force, RFC 6020, Oct. 2010, 173 pp.
Communication under Rule 71(3) EPC dated Apr. 4, 2017 in counterpart EP Application No. 15180500.9, 42 pps.

* cited by examiner

TRANSACTION INTEGRITY FOR NETWORK SERVICES CONFIGURATION

TECHNICAL FIELD

The invention relates to computer networks and, more specifically, to controlling computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Routers include a control plane, sometimes called a management plane, which maintains the routing information, and a forwarding plane, which forwards received packets according to the routing information.

Network service providers provide services such as linking customer sites through a network core (VPN services) or subscribers to a service, security, tunneling, virtual private networks, filtering, load-balancing, VoIP/Multimedia processing and various types of application proxies (HTTP, XML, WAP, etc.) to incoming packets. Service providers also provide content-specific services designed to improve the quality of a user's experience, for example, video streaming and caching. To provide these new services, service providers have often turned to specialized, dedicated appliances. In some cases, routers have been modified to include additional hardware or software that applies various services to the incoming packets. For example, network interfaces or line cards installed in a forwarding or service plane of a router may be configured to perform particular services, such as the services described above.

Deploying services and responding to network events that impact such services may be expensive and time consuming. For instance, manual provisioning of services may require substantial time and human resources to determine whether network resources are available. In the event of a network event, such as a link or device failure, services may need to be manually re-provisioned by determining whether an alternative set of network resources are available. As such, manual provisioning of services may result in higher operational costs because existing techniques often require time-consuming evaluation of multiple resources and the respective capabilities of such resources, and service providers and large enterprises face pressure to responsively and rapidly deploy requested services while reducing overall capital expenditures (CapEx) and operational expenditures (OpEx). Network managers are seeking to move to an operational model where capacity upgrades are targeted, service-driven, and can adapt dynamically to ever-changing needs of their customers in near real-time, all while leveraging existing investments in network infrastructure. Current service provisioning models provide limited flexibility, for they are typically tightly coupled with the topological placement of the network devices and further, require significant operational expenditure for managing multiple different technologies for deployment, troubleshooting, and fault recovery.

SUMMARY

In general, techniques are described for facilitating transaction integrity for parallelized servicing provisioning in a network. Workers of one or more controllers are tasked with executing service requests for a network by configuring network resources to implement the requested services. In some examples of the techniques, the workers acquire locks provided by a coordination repository for each network resource prior to configuring the network resource. The coordination repository may provide centralized per-resource locks that permit, for each resource, only one worker to have configuration access to the resource at any time. In other words, the coordination repository per-resource locks may enable single-threaded access to any of the network resources: to configure a network resource as part of provisioning a service, a worker must acquire the corresponding lock provided by the coordination repository. The worker may then configure the network resource according to a run-to-completion model.

In some cases, the coordination repository provides the lock for each network resource using a software representation having a one-to-one association with the network resource. The workers may access a data structure that maps network resources to corresponding representations in order to identify and request locks for the network resources. The coordination repository may implement locks using native locking mechanisms provided by the network resource, e.g., a NETCONF configuration lock, or by using synchronization primitives internal to the coordination repository. Upon providing a lock for a network resource to a worker, the coordination repository blocks other workers from acquiring the lock for the network resource so as to provide single-threaded configuration access to the network resource. A worker may refrain from attempting to configure a network resource unless and until a previously-allocated lock has been released and the worker has acquired the lock for the network resource.

By enabling single-threaded configuration access to network resources, the techniques may facilitate transaction integrity for service configurations to reduce instances of service misconfiguration and/or inconsistency across the network resources that could result in network service malfunctions. As a result, the techniques may enable a parallel service provisioning model in which multiple workers (or multiple routines of a single worker) can simultaneously provision services in a network by simultaneously configuring different network resources, each worker having exclusive configuration access to any given network resource at any one time. With a parallel provisioning model enabled, network operators can scale service provisioning to meet dynamic and increasing service demands, provide for customer self-provisioning portals for faster service order-to-completion, and provide real-time service provisioning reactive to network events, for instance.

In one example, a method comprises receiving, by a controller that provisions services for transporting packet flows within a network, a service request that comprises a definition for a service to be provided by the network for a subscriber or a customer of the network. The method also comprises determining, by the controller, a plurality of network resources of at least one network device to be configured to implement the service in the network and apply the service to the packet-based network traffic of the subscriber. The method also comprises, only upon acquiring a lock for the plurality of network resources of the at least one network device and by the controller, configuring the plurality of network resources of the at least one network device to provision the service, wherein the lock is acquired from a network-wide coordination repository that stores a software representation for each of the plurality of network resources of the at least one network device, and wherein the lock provides exclusive configuration access to the controller for the plurality of network resources.

In another example, a controller provisions services for transporting packet flows within a network. The controller comprises one or more processors coupled to a memory; and a service provisioning module executed by the one or more processors to receive a service request that comprises a definition for a service to be provided by the network for a subscriber or a customer of the network, and determine a plurality of network resources of at least one network device to be configured to implement the service in the network and apply the service to the packet-based network traffic of the subscriber. The controller also includes a locking unit executed by the one or more processors to acquire a lock from a network-wide coordination repository that stores a software representation for each of the plurality of network resources of the at least one network device, the lock providing exclusive configuration access to the service provisioning module for the plurality of network resources, wherein the service provisioning module, only upon the locking unit acquiring the lock for the plurality of network resources of the at least one network device, is executed by the one or more processors to configure the plurality of network resources of the at least one network device to provision the service.

In another example, a non-transitory computer-readable medium contains instructions. The instructions cause a programmable processor to receive, by a controller that provisions services for transporting packet flows within a network, a service request that comprises a definition for a service to be provided by the network for a subscriber or a customer of the network; determine, by the controller, a plurality of network resources of at least one network device to be configured to implement the service in the network and apply the service to the packet-based network traffic of the subscriber; and only upon acquiring a lock for the plurality of network resources of the at least one network device and by the controller, configure the plurality of network resources of the at least one network device to provision the service, wherein the lock is acquired from a network-wide coordination repository that stores a software representation for each of the plurality of network resources of the at least one network device, and wherein the lock provides exclusive configuration access to the controller for the plurality of network resources.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
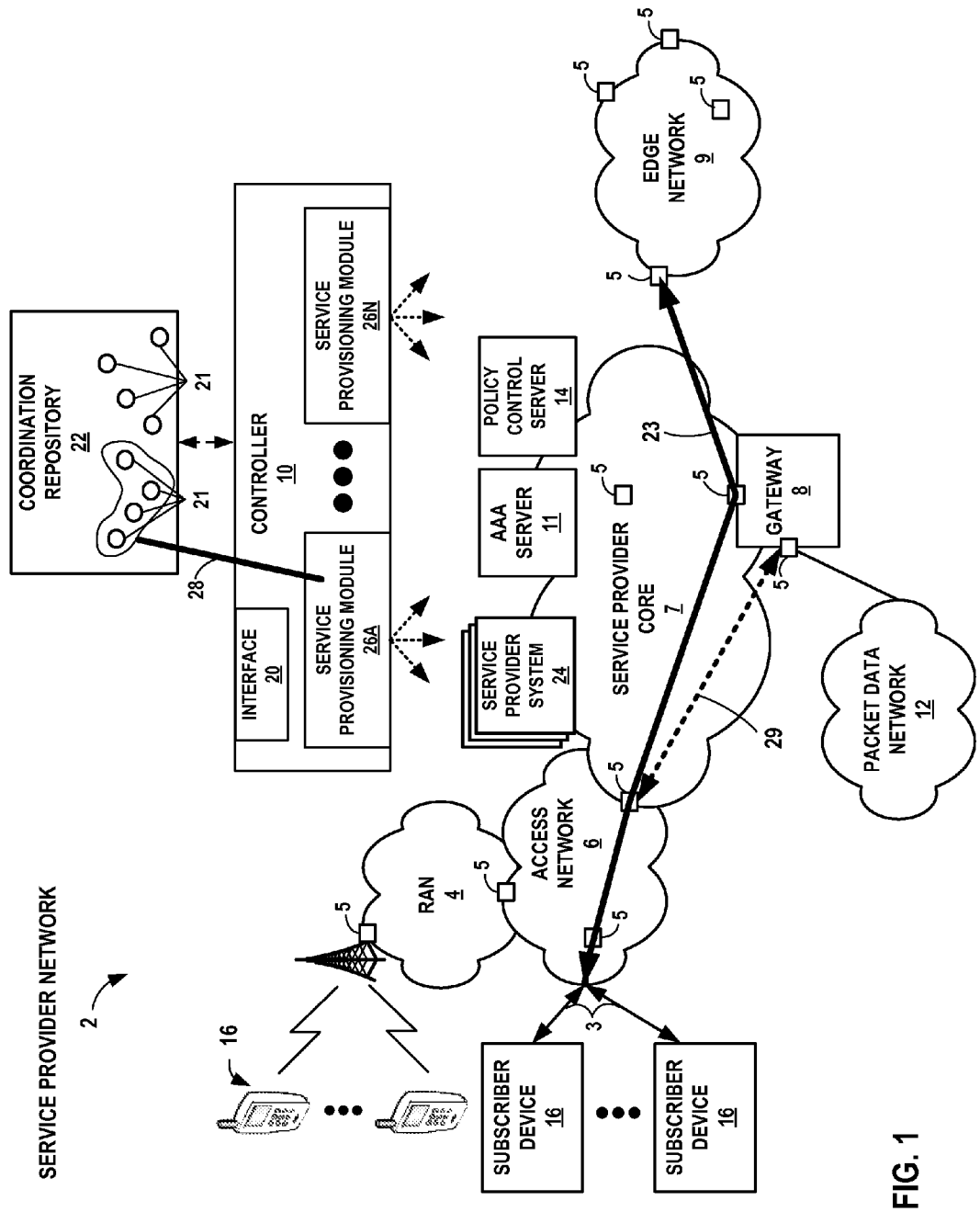
FIG. 1 illustrates an example network system in accordance with techniques described herein.

FIG. 1 illustrates an example network system in accordance with techniques described herein. The example network system of FIG. 1 includes a service provider network 2 that provides packet-based network services to subscriber devices 16A-16N (collectively, "subscriber devices 16"). That is, service provider network 2 provides authentication and establishment of network access for subscriber devices 16 such that the subscriber device may begin exchanging data packets with PDN 12, which may represent an internal or external packet-based network such as the Internet. Although described with respect to a service provider operating a service provider network 2, network 2 may in some examples represent an enterprise network managed by a large enterprise. Thus, references to a "service provider" or "provider" may similarly refer to an "enterprise manager," "network manager," or "operator." In addition, although described primarily with respect to "subscribers" that connote end-users of a service provider network services, the techniques described herein are similarly applicable to "customers" of the service provider and to customer devices such as cell towers, multi-tenant units (MTUs), residential aggregation points, and so forth. Examples of customers may include universities, businesses, or any other entities that purchase, lease, or otherwise use services provided by service provider network 2.

In the example of FIG. 1, service provider network 2 includes access network 6 ("access network 6") that provides connectivity to packet data network (PDN) 12 and edge network 9 via service provider core network 7 and gateway 8. Service provider core network 7 and PDN 12 provide packet-based services that are available for request and use by subscriber devices 16. As examples, core network 7 and/or PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Subscriber devices 16 connect to gateway 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of service provider network 2 via radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. Subscriber devices 16 connect to access network 6 via access links that comprise wired and/or wireless communication links. The term "communication link," as used herein, comprises any form of transport medium, wired or wireless, and can include intermediate nodes such as network devices. Each of access links may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from service provider core network 7 of the service provider. Access network 6 may include multiple "access" segment coupled to an aggregation segment and/or backhaul network owned or leased by the service provider. An access node of an access network couples to the customer premises equipment (CPE) to process subscriber packets at layer 2 (L2) or higher. Access nodes may include digital subscriber line access multiplexors (DSLAMs), multi-tenant units (MTUs), passive optical network (PON) optical line termination devices such as Reconfigurable Optical Add-Drop Multiplexer (ROADM) with microelectromechanical systems (MEMS) and Liquid Crystal on Silicon (LCoS), cell site gateways (CSGs), eNode Bs, LTE/GSM/UMTS controllers, and microwave as well as virtual Multiple-Input and Multiple-Output (MIMO) over distributed base stations. In the cable operator (Multiple System Operator (MSO)) domain, the Data Over Cable Service Interface Specification (DOCSIS) 3.x standards specify a means of channel bonding and dynamic frequency allocation. Broadband cable access network nodes may include Cable Modem Termination Systems (CMTS) and Cable Modems, e.g., as part of a Converged Cable Access Platform (CCAP) solution.

Access network 6 includes network nodes that execute communication protocols to transport control and user data to facilitate communication between subscriber devices 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples of access network 6 may also include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Transport nodes of the access network connect access nodes to border nodes that enable inter-region packet transport. Border nodes may include area border routers and autonomous system boundary routers (ASBRs). In the illustrated example, border nodes (not shown) couple access network 6 to core network 7.

Service provider core network 7 (hereinafter, "core network 7") offers packet-based connectivity to subscriber devices 16 attached to access network 6 for accessing PDN 12. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. PDN 12 may represent an edge network coupled to core network 7, e.g., by a customer edge device such as customer edge switch or router. PDN 12 may include a data center.

Access network 6, core network 7, and edge network 9 may include service nodes that apply services to subscriber packets. Service node examples include L2 provider edge (PE) or L3 PE routers, broadband network gateway (BNGs), peering routers, content servers, media gateways, base station controllers, and so forth. Illustrated gateway 8 includes an example of a service node.

In examples of network 2 that include a wireline/broadband access network, gateway 8 may represent a Broadband Network Gateway (BNG), a Broadband Remote Access Server (BRAS), MPLS Provider Edge (PE) router, core router, L2/L3 PE router, or gateway, for instance. In examples of network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component.

Network 2 additionally includes, in this example, edge network 9. In some examples, edge network 9 may represent, e.g., a business edge network, broadband subscriber management edge network, mobile edge network, customer site such as enterprise branch offices, or a combination thereof. In some examples, edge network 9 may offer service provider managed network-hosted Value Added Services (VAS) including application-aware, and subscriber-aware services and charging, for instance. Access network 6 of FIG. 1 is also an example of an edge network for service provider network 2. Edge network 9 may alternatively represent a data center/value-added services complex that offers services by a computing environment comprising, e.g., a scalable cluster of general computing devices, such as x86 processor-based servers. As another example, the computing environment may comprise a combination of general purpose computing devices and special purpose appliances.

Service provider core 7 may couple to multiple edge networks, such as any of the aforementioned examples of edge network 9.

As virtualized, individual network services provided by service nodes of the data center can scale through the allocation of virtualized memory, processor utilization, storage and network policies, as well as by adding additional load-balanced virtual machines. In one example, edge network 9 includes a data center that comprises a set of interconnected, high-performance yet off-the-shelf packet-based routers and switches that implement industry standard protocols. In one example, edge network 9 includes a data center that comprises off-the-shelf components that provide Internet Protocol (IP) over an Ethernet (IPoE) point-to-point connectivity.

A network service provider that administers at least parts of network 2 typically offers services to subscribers associated with devices, e.g., subscriber devices 16, which access the service provider network. Services offered may include, for example, traditional Internet access, Voice-over-Internet Protocol (VoIP), video and multimedia services, security services, and linking customer sites through the core network 7 using one of a point-to-point Ethernet service, multipoint-to-multipoint Ethernet service, point-to-multipoint Ethernet service, full-mesh L3VPN, and hub-and-spoke L3VPN, for instance. As described above with respect to access network 6, core network 7 may support multiple types of access network infrastructures that connect to service provider network access gateways to provide access to the offered services.

In general, any one or more of subscriber devices 16 may request authorization and data services by sending a session request to gateway 8. In turn, gateway 8 typically accesses Authentication, Authorization and Accounting (AAA) server 11 to authenticate the subscriber device requesting network access. Once authenticated, any of subscriber devices 16 may send subscriber data traffic toward service provider core network 7 in order to access and receive services provided by PDN 12 or edge network 9, and such packets may traverse service provider core 7 as part of at least one packet flow. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device may originate multiple packet flows upon authenticating to service provider network 2 and establishing a communication session for receiving data services.

Service provider network 2 may include an Authentication, Authorization and Accounting server 11 ("AAA server 11"). Upon detecting a new traffic flow, gateway 8 may authenticate new subscribers to AAA server 11, e.g., by way of the RADIUS or Diameter protocols, and, at this time, receive a service request or other information that defines the services to be applied to the subscriber or maps the various traffic expected for the subscriber to one or more service flows. Upon detecting a new flow, the gateway 8 may select a service chain for the flow based on the service profile and traffic type. For example, gateway 8 may select a service chain for the packet based on the service profile received for the subscriber and/or based on the type of traffic, e.g., HTTP traffic or VoIP traffic.

The various networks of service provider network 2, i.e., core network 7, edge network 9, access network 6, and RAN 4 include network resources 5 configurable by controller 10 as part of provisioning services for use by customers/subscribers of the network 2. Any of network resources 5 may represent a device to be configured (DTC), such as a router, switch, optical device, Converged Cable Access Platform (CLAP) element, microwave element, passive optical network element, a service node, a virtual machine executing a service, a virtual router for a BGP IP VPN, and other network elements. In some examples, any of network resources 5 may alternatively or additionally represent one or more hardware or software components of a given DTC, such as a hardware or software interface, a service line card, a forwarding line card, a network link, a label-switched path (LSP), a routing instance (e.g., a virtual routing and forwarding instance (VRF)), etc. In other words, a DTC may include multiple network resources 5, so long as each of the network resource are capable of being separately and synchronously configured without loss of integrity to the operation of any of the network resources.

A network manager employs controller 10 to provision services within service provider network 2. For example, such services may provide access for subscriber devices 16 to service provider-provided resources. Controller 10 is a high-level controller for configuring and managing various and respective domains of service provider network 2 (e.g., core network 7, access network 6, and edge network 9). In some instances, controller 10 may manage deployment of virtual machines within the operating environment of a value-added services complex. Controller 10 may interact with gateway 8 and other to specify service chains. For example, the service chain information provided by controller 10 may specify any combination and ordering of value-added services, traffic engineering information (e.g., labels or next hops) for tunneling or otherwise transporting (e.g., MPLS or IP tunnels) packet flows along service paths, rate limits, Type Of Service (TOS) markings or packet classifiers that specify criteria for matching packet flows to a particular service chain. Further example details of an SDN controller for a software-defined network are described in PCT International Patent Application PCT/US2013/044378, filed Jun. 5, 2013, the entire contents of which are incorporated herein by reference.

Service provider network 2 may include a service provider system 24. In general, service provider system 24 may send requests to controller 10 that cause the controller to validate, provision, and/or manage services provided by service provider network 2. Service provider system 24 may send data-interchange formatted messages to interface 20 of controllers 10 that include requests to validate, provision, and/or manage services provided by service provider network 2.

In some examples, service provider system 24 is implemented and operated by the network manager that manages service provider network 2. In such examples, customers of the service provider may interact with service provider system 24 using a client device (not shown). For instance, service provider system 24 may provide a portal that includes a graphical user interface and/or application programming interface (API), which allow customers to submit requests for network services. In some examples, service provider system 24 may be owned, operated, and/or maintained by the customer rather than the service provider that manages service provider network 2.

Service provider system 24 may send messages to interface 20 of controller 10 to request network services. In some examples, interface 20 is implemented according to a stateless, client-server communications architecture. The stateless, client-server communications architecture may rely on a protocol that is cacheable. As an example, interface 20 may be implemented according to a representational state transfer (REST) software architecture to send and receive messages with service provider system 24. Interface 20 may execute HTTP as an application protocol in some cases.

To submit requests to controller 10, service provider system 24 may generate messages that include service requests. A service request may include a definition of one or more services and/or resources of a network requested by a customer. As one example, a service request may specify a Virtual Private Network (VPN) service for a customer between one or more customer sites.

An example of a service request may include the following:

```
{
    "service_name" : "citi_l3vpn",
    "service_type" : "l3vpn",
    "customer" : "citi",
    "sites" : [
        "SFO",
        "LAX",
        "NYC",
        "DFW"
    ],
    "topology" : "full-mesh",
    "qos_profile" : "gold"
}
```

The attributes "service_name", "service_type", "customer", "sites", "topology" and "qos_profile" attributes together with the corresponding values collectively define a request to configure a full mesh VPN with a Gold quality of service profile between customer sites SFO, LAX, NYC, and DFW.

In response to input provided by a customer to request a service, service provider system 24 may generate a service request defining the service, such as described for the VPN service above. Service provider system 24 sends a message including the service request to interface 20.

Controller 10 includes multiple service provisioning modules 26A-26N (collectively, "service provisioning modules 26"), with each service provisioning module capable of realizing the state of the network represented by the service request by configuring network resources 5. That is, service provisioning modules 26 may translate the high-level data model of the service abstraction defining the service into a lower level form suitable for interacting with network resources 5 of service provider network 2. A controller 10 that receives the message may validate the request included in the message and provision the service if sufficient network resources 5 exist to satisfy the request. In this way, interface 20 and service provisioning modules 26 may provide a flexible service abstraction layer for controllers 10 that can support fast-changing service types, adapt to real time network resources, and enforce business logic.

Service provider system 24 may be implemented as hardware, software, and/or a combination of hardware and software. Although shown as a standalone system in FIG. 1, any set of functionality of service provider system 24 described in this disclosure may be implemented in controllers 10, gateway 8, AAA server 11, policy control server 14, or any other suitable device.

Controller 10 may provision services in multiple segments corresponding to various boundaries and/or layers of service provider network 2. For example, a virtual LAN (VLAN) or an L2/L3 circuit for a first service segment for a service used by any one or more of subscriber devices 16 may be carried through the access network 6 infrastructure and mapped to a virtual routing and forwarding table (VRF table) or a virtual private LAN service (VPLS) instance at a PE router in a point of presence of core network 7. The second service segment may then be initiated at the ingress PE router that delineates a boundary between access network 6 and core network 7. Core network 7 carries the service across to the other end, the egress PE router, where this second service segment terminates and gets mapped into the access/aggregation infrastructure on the receiving end, perhaps as the last segment of the service and operating over edge network 9. This is merely one illustrative example of service provisioning. Other examples of varying complexity are described further below. Indeed, various networks illustrated in FIG. 1, such as core network 7, may include multiple layers having network resources 5 that may be separately provisioned as individual segments of a service in order to establish the service. In addition, each of the various segments may employ different types of networks, e.g., optical, routing, and wireless, to transport data.

In accordance with techniques described herein, the network operator deploys a coordination repository 22 that provides a network-wide locking service for each of network resources 5. Coordination repository 22 represents one or more servers that singularly or cooperatively provide the locking service. Coordination repository 22 may utilize ZooKeeper®, published by The Apache Software Foundation, or other coordination service to provide the locking service. In the example of FIG. 1, coordination repository 22 stores software representations 21 corresponding to respective network resources 5 of service provider network 2. Each of software representations 21 represents a corresponding one of network resources 5, and coordination repository 22 may provide per-network resource 5 locks by using corresponding software representations 21 to coordinate and exclude access to the network resources.

In some examples, each of software representations 21 is associated with a lock that defines a lock state for the corresponding network resource 5. In other words, if a given software representation 21 is locked, according to the coordination repository 22, then the corresponding network resource 5 is also locked, and a service provisioning module 26 attempting to obtain the lock is excluded from obtaining the lock. In this way, a lock for a given software representation 21 provides exclusive configuration access to a corresponding network resource 5. Each service provisioning module 26 refrains from attempting to configure a network resource 5 unless the service provisioning module 26 has the lock for the network resource 5.

Controller 10 discovers network resources by means of routing protocols such as Interior Gateway Protocols (IGPs), as well as management protocols/methods such as Netconf/YANG. In addition, the controllers 10 may discover the network state by gathering load status, statistics, counters, alarms, and health indications by using management methods such as Netconf/YANG, Simple Network Management Protocol (SNMP), Transport Layer Interface (TLI), and/or Common Object Request Broker Architecture (CORBA).

Controller 10 facilitates dynamic provisioning of routing and switching network elements using routing protocols such as Border Gateway Protocol (BGP) route reflectors and Path Computation Element Protocol (POT), management provisioning protocols (e.g., Netconf/YANG), and emerging software-defined networking (SDN) protocols (e.g., Open-Flow).

Service provisioning modules 26 of controller 10 may independently execute path computation algorithms to calculate paths and assign loads among network resources 5. For optical network segments, this may include specifying wavelength assignment, optical regeneration, and wavelength conversion. Each of service provisioning modules 26 may represent a software process or process routine executed by a thread of a multi-threaded process that executes service provisioning modules 26, for instance. In some instances, a network manager deploys multiple instances of controller 10, each of which may include one or more parallel instances of service provisioning module 26.

Service provisioning modules 26 of controller 10 independently and in some cases synchronously (i.e., at the same time) configure service provider network 2 by issuing commands to elements of network 2 that includes network resources 5 in order to establish paths. For this purpose the service provisioning modules 26 may use routing protocols, signaling protocols such as Multiprotocol Label Switching (MPLS) Resource Reservation Protocol with Traffic Engineering extensions (RSVP-TE), Generalized MPLS, or configuration protocols such as Netconf/Yang, SNMP, PCEP, or other protocols for installing state or otherwise controlling elements of service provider network 2.

FIG. 1 illustrates service provisioning module 26A realizing a network configuration cora service 23 that connects access network 6 to edge network 9 by way of service provider core 7. To maintain the integrity of the service provisioning transaction while realizing the network configuration for service 23, service provisioning module 26A attempts to obtain the locks for each of network resources 5 to be configured by service provisioning module 26A in order to implement service 23. As described below further with respect to FIG. 4, service provisioning module 26A may in some examples serially obtain, configure, and release locks 28 for the network resources 5 required for service 23. As described below further with respect to FIG. 5, service provisioning module 26A may in some examples atomically obtain all locks 28 for the network resources 5 required for service 23, configure the network resources required for service 23, and then atomically or non-atomically release the locks 28. To obtain locks "atomically" is to obtain all of the locks prior to configuring any of the corresponding network resources 5.

In the illustrated example, because service provisioning module 26A successfully obtains locks 28, service provisioning module 26A configures the network resources 5 required for service 23 to provision the service. Service provisioning module 26N may be tasked by controller 10 to transact a service request for service 29 having a required network resource 5 in common with service 23. That is, both service 23 and service 29 require the common network resource 5 to be configured in order for service 23 and service 29 to be established. While service provisioning module 26A has locks 28, service provisioning module 26N refrains from attempting to configure the at least one network resource 5 that service 29 has in common with service 23, for service provisioning module 26N is unable to obtain the required one or more locks.

As a result of service provisioning module 26 utilizing the software representations 21 to represent respective network resources 5 and associating the software representations 21 with network-wide synchronous locks provided by coordination repository 22, service provisioning modules 26 of controller 10 may enforce single-threaded configuration access to network resources 5, which may facilitate transaction integrity for service configurations to reduce instances of service misconfiguration and/or inconsistency across the network resources 5 of network 2, which that could otherwise result in network service malfunctions.

Multiple service provisioning module 26 operating in parallel may thus synchronously attempt to provision services 23, 29 by simultaneously configuring different network resources, each worker having exclusive configuration access to any given network resource at any one time. With a parallel provisioning model enabled, the network manager for service provider network 2 can scale service provisioning to reliably meet dynamic and increasing service demands, provide for customer self-provisioning portals (e.g., via service provider system 24) for faster service order-to-completion, and provide real-time service provisioning reactive to network events, for instance. The techniques may thus provide a network-wide service coordination mechanism for carrier-grade and other network infrastructure, including legacy infrastructure.

Figure 2:
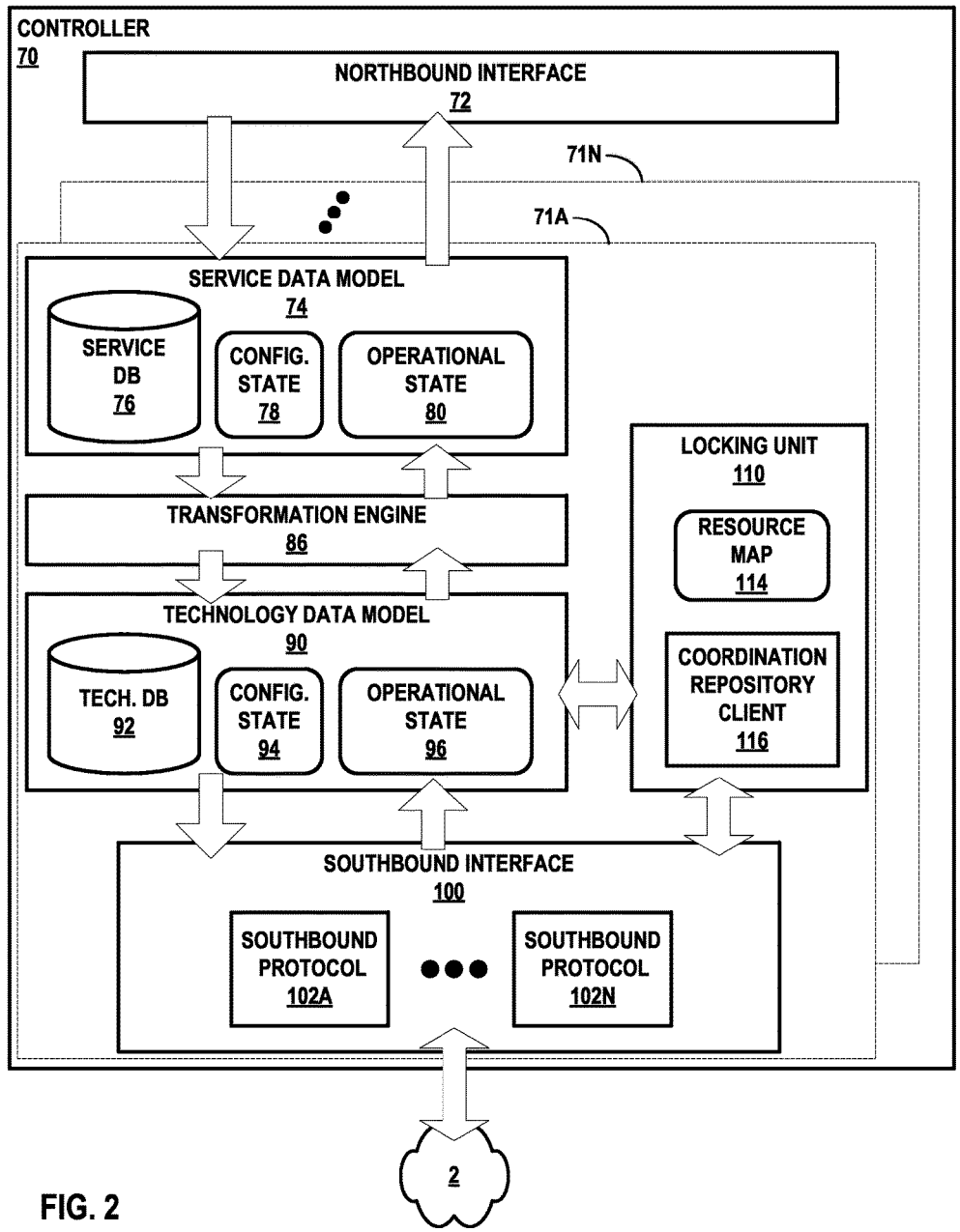
FIG. 2 is a block diagram illustrating an example instance of a controller according to techniques described in this disclosure.

FIG. 2 is a block diagram illustrating an example instance of a controller that operates according to techniques described in this disclosure. Controller 70 is a logically centralized but in some cases physically distributed controller for a network that may be configured to provide services. Controller 70 includes, in this example, a plurality of service provisioning modules 71A-71N (collectively, "service provisioning modules 71") to transact requested services by validating, provisioning, and/or managing the requested services. Service provisioning modules 71 may adapt to network conditions by scaling to increase the number of service provisioning modules 71 instances (i.e., scale horizontally). Controller 70 may represent an example instance of controller 10 of FIG. 1, and service provisioning modules 71 may represent example instances of service provisioning modules 26 of FIG. 1.

Some components of controllers 70, such as one or more programmable processors and network interfaces, are not shown for ease of illustration purposes. These components may include hardware and instructions to execute modules of controller 70. Controller 70 presents a northbound interface 72 that may be invoked by other controllers in a hierarchical arrangement of controllers or by an orchestrator, administrator, or other entity, to modify configuration state 78 ("config. state 78") or extract operational state 80 of the controller 70 that is descriptive of the service data model 74. Northbound interface 72 may represent an example instance of interface 20 of FIG. 1. Northbound interface 72 may be used for integration with an orchestration system such as OpenStack: northbound interface 72 may also or alternatively used by other applications or the operator's Operations Support Systems (OSS)/Business Support Systems (BSS). Northbound interface 72 may in some cases present a RESTful Application Programming Interface (API).

Each of service provisioning modules 71 includes similar components to perform similar functionality, said components and functionality being described hereinafter with respect to service provisioning module 71A. Service database 76 stores objects that represent instantiated services within a formal service data model 74. The high-level service model 74 may include, e.g., a demand calendar and constraints upon the network directed by the provider/enterprise. Transformation engine 86 transforms the service objects in service database 76 from the high-level service data model 74 to corresponding lower-level objects in the technology data model 90. Transformation engine 86 may include a schema transformer. In this sense, transformation engine 86 operates as a compiler of service data model 74 to technology data model 90. Whereas the high-level service data model 74 describes services previously requested and instantiated or being processed for eventual instantiation with the network segment under control of controller 70, the low-level technology data model 90 describes how those services are implemented or are to be implemented within the network, as represented in technology database 92. Technology database 92 may include, for example, an object that describes a TE-LSP that at least partially implements a service in service database 76. Technology database 92 further include identifiers of network resources of the network managed by controller 70, such as network resources 5 of service provider network 2. The technology data model 90 includes configuration state 94 that describes respective configurations of the network elements as well as operational state 96 that describes respective operational characteristics of the network elements, such as load, available bandwidth, etc.

Put another way, the high-level service data model 74 describes the desired state of the network under the control of controller 70 at a very high level of abstraction, using objects that map directly to services provided to end users—for example, a virtual network, a connectivity policy, or a security policy. The low-level technology data model 90, on the other hand, describes the desired state of the network at a very low level of abstraction, using objects that map to specific network protocol constructs such as a BGP route target or a VxLAN network identifier. Accordingly, southbound interface 100 executes one or more southbound protocols 102A-102K (collectively, "southbound protocols 102") with which controller 10 may obtain configuration state 94 and operational state 96 from and inject configuration state 94 and operational state 96 into the network segment 30 under the control of controller 70, where configuration state 94 and operational state store objects intelligible to southbound protocols 102 and mapped to constructs of southbound protocols 102. In this way, service provisioning module 71A may make the state of the network under control of controller 70 match the desired state of the network as received by service provisioning module 71A via northbound interface 72 and represented by service data model 74. Southbound protocols 102 may include protocols for path provisioning as well as for topology discovery. For example, southbound protocols 102 may include Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), NETCONF/Yang, Interface to the Routing System (I2RS) protocols, CLIs for the network elements, and SNMP.

In accordance with techniques of this disclosure, service provisioning module 71A additionally includes a locking unit 110 configured to manage network resource locking for service provisioning module 71A Resource map 114 maps network resources specified in technology database 92 to respective virtual/software representations of the network resources. Coordination repository client 116 represents a client of coordination repository 22 and is thus able to access the locking service provided by the coordination repository 22. Coordination repository client 116 may execute libraries, protocols, or other software by which to access a service interface provided by the coordination repository 22 to obtain/release locks for network resources.

When service provisioning module 71A seeks to configure a network resource via southbound interface 100, it provides an identifier for the network resource to locking unit 110, which maps the identifier to a virtual/software representation of the network resource using resource map 114. As described above with respect to FIG. 1, coordination repository 22 manages the representations of network resources. Coordination repository client 116 provides an identifier for the representation of the network resource to coordination repository 22 with a request for a lock. Coordination repository client 116 subsequently receives a message from coordination repository 22 giving or denying the lock. Upon obtaining, serially or atomically, required locks for network resources for a requested service, service provisioning module 71A configured the network resources to implement the service. Each of service provisioning modules 71 may operate synchronously, in some cases seeking locks for the same network resources at overlapping times.

Figure 3:
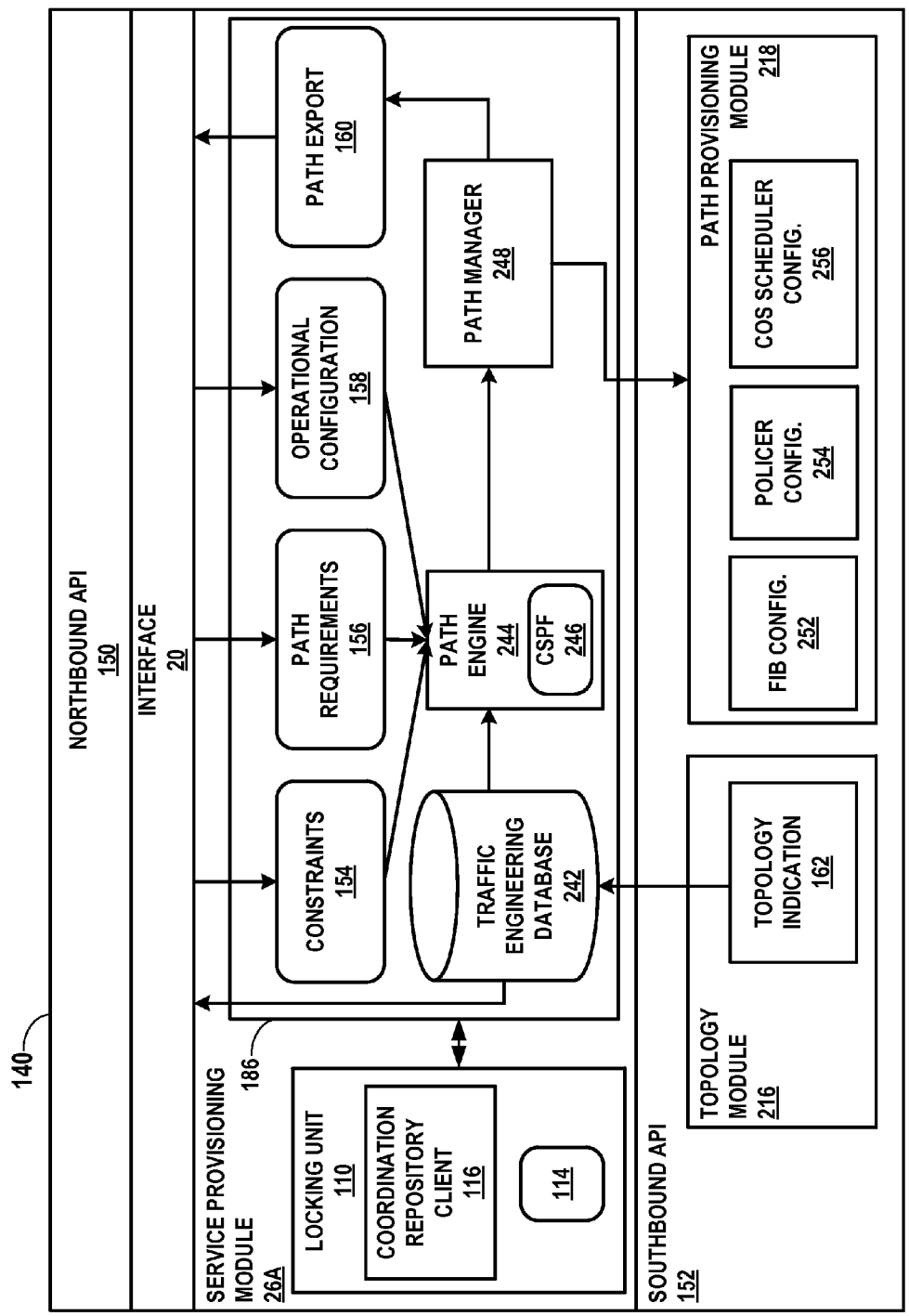
FIG. 3 is a block diagram illustrating, in detail, an example controller according to techniques described in this disclosure.

FIG. 3 is a block diagram illustrating, in detail another example controller such as controller 10 of FIG. 1 or controllers 71 of FIG. 2, in accordance with techniques of this disclosure. In this example, controller 140 includes northbound and southbound interfaces in the form of northbound application programming interface (API) 150 and southbound API 152, which may represent examples of northbound interface 72 and southbound interface 100, respectively. Northbound API 150 includes methods and/or accessible data structures by which network services applications may configure and request path computation and query established paths within the path computation domain for the controller. Southbound API 152 includes methods and/or accessible data structures by which service provisioning module 26A-26N (only 26A is shown in FIG. 3) receives topology and network resource information for the path computation domain and establishes paths by accessing and programming data planes of aggregation nodes and/or access nodes within the path computation domain.

Path computation module 186 includes data structures to store path information for computing and establishing requested paths. These data structures include constraints 154, path requirements 156, operational configuration 158, and path export 160. Network services applications may invoke northbound API 150 to install and/or query data from these data structures. Constraints 154 represent a data structure that describes external constraints upon path computation. Constraints 154 allow network services applications to, e.g., modify link attributes before path computation module 186 computes a set of paths. For examples, Radio Frequency (RF) modules (not shown) may edit links to indicate that resources are shared between a group and resources must be allocated accordingly. Network services applications may modify attributes of link to effect resulting traffic engineering computations. In such instances, link attributes may override attributes received from topology indication module 216 and remain in effect for the duration of the node/attendant port in the topology. A link edit message to constraints 154 may include a link descriptor specifying a node identifier and port index, together with link attributes specifying a bandwidth, expected time to transmit, shared link group, and fate shared group, for instance.

Path export 160 represents an interface that stores path descriptors for all paths currently committed or established in the path computation domain. In response to queries received via northbound API 150, path export 160 returns one or more path descriptors. Queries received may request paths between any two network devices terminating the path(s). Path descriptors may be used by network services applications to set up forwarding configuration at the edge and access nodes terminating the path(s). A path descriptor may include an Explicit Route Object (ERO). A path descriptor or "path information" may be sent, responsive to a query from an interested party. A path export message delivers path information including path type (primary or detour); bandwidth for each CoS value; and, for each node in the ordered path from ingress to egress, a node identifier, ingress label, and egress label.

Path requirements 156 represent an interface that receives path requests for paths to be computed by path computation module 186 and provides these path requests (including path requirements) to path engine 244 for computation. A path requirement message may include a path descriptor having an ingress node identifier and egress node identifier for the nodes terminating the specified path, along with request parameters including CoS value and bandwidth. A path requirement message may add to or delete from existing path requirements for the specified path.

Topology module 216 includes topology indication module 162 to handle topology discovery and, where needed, to maintain control channels between service provisioning module 26 and nodes of the path computation domain (i.e. the domain controlled by controller 140). Topology indication module 162 may include an interface to describe received topologies to path computation module 186.

Topology indication module 162 may use a topology discovery protocol to describe the path computation domain topology to path computation module 186. Using topology discovery, topology indication module 162 may receive a list of node neighbors, with each neighbor including a node identifier, local port index, and remote port index, as well as a list of link attributes each specifying a port index, bandwidth, expected time to transmit, shared link group, and fate shared group, for instance. These are examples of constructs mapped to the low-level technology data model 90 of FIG. 2.

Topology indication module 162 may communicate with a topology server, such as a routing protocol (e.g. BGP) route reflector, to receive topology information for a network layer of the network. Topology indication module 162 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology indication module 162 may in some instances be a passive listener that neither forwards nor originates routing protocol advertisements. In some instances, topology indication module 162 may alternatively, or additionally, execute a topology discovery mechanism such as an interface for an Application-Layer Traffic Optimization (ALTO) service. Topology indication module 162 may therefore receive a digest of topology information collected by a topology server, e.g., an ALTO server, rather than executing a routing protocol to receive routing protocol advertisements directly.

In some examples, topology indication module 162 receives topology information that includes traffic engineering (TE) information. Topology indication module 162 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, topology indication module 162 executes BGP-TE to receive advertised TE information for inter-autonomous system and other out-of-network links.

Traffic engineering database (TED) 242 stores topology information, received by topology indication module 162, for a network that constitutes a path computation domain for controller 140 to a computer-readable storage medium (not shown). TED 242 may include one or more link-state databases (LSDBs), where link and node data is received in routing protocol advertisements, received from a topology server, and/or discovered by link-layer entities such as an overlay controller and then provided to topology indication module 162. In some instances, an operator may configure traffic engineering or other topology information within TED 242 via a client interface.

Path engine 244 accepts the current topology snapshot of the path computation domain in the form of TED 242 and computes, using TED 242, CoS-aware traffic-engineered paths between nodes as indicated by configured node-specific policy (constraints 154) and/or through dynamic networking with external modules via APIs. Path engine 244 may further compute detours for all primary paths on a per-CoS basis according to configured failover and capacity requirements (as specified in operational configuration 158 and path requirements 156, respectively).

In general, to compute a requested path, path engine 244 determines based on TED 242 and all specified constraints whether there exists a path in the layer that satisfies the TE specifications for the requested path for the duration of the requested time. Path engine 244 may use the Djikstra constrained SPF (CSPF) 246 path computation algorithms for identifying satisfactory paths though the path computation domain. If a satisfactory computed path for the requested path exists, path engine 244 provides a path descriptor for the computed path to path manager 248 to establish the path using path provisioning module 218. A path computed by path engine 244 may be referred to as a "computed" path, until such time as path provisioning module 248 programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 248 establishes computed scheduled paths using path provisioning module 218, which in this instance includes forwarding information base (FIB) configuration module 252 (illustrated as "FIB CONFIG. 252"), policer configuration module 254 (illustrated as "POLICER CONFIG. 254"), and CoS scheduler configuration module 256 (illustrated as "COS SCHEDULER CONFIG. 256").

FIB configuration module 252 programs forwarding information to data planes of aggregation nodes or access nodes of the path computation domain. The FIB of an aggregation node or access node includes the MPLS switching table, the detour path for each primary LSP, the CoS scheduler per-interface and policers at LSP ingress. FIB configuration module 252 may implement, for instance, a software-defined networking (SDN) protocol such as the OpenFlow protocol to provide and direct the nodes to install forwarding information to their respective data planes. Accordingly, the "FIB" may refer to forwarding tables in the form of, for instance, one or more OpenFlow flow tables each comprising one or more flow table entries that specify handling of matching packets. FIB configuration module 252 may in addition, or alternatively, implement other interface types, such as a Simple Network Management Protocol (SNMP) interface, path computation element protocol (PCEP) interface, a Device Management Interface (DMI), a CLI, Interface to the Routing System (I2RS), or any other node configuration interface. FIB configuration module interface 252 establishes communication sessions with aggregation nodes or access nodes to install forwarding information to receive path setup event information, such as confirmation that received forwarding information has been successfully installed or that received forwarding information cannot be installed (indicating FIB configuration failure). Additional details regarding PCEP may be found in "Path Computation Element (PCE) Communication Protocol (PCEP)," Network Working Group, Request for Comment 5440, March 2009, the entire contents being incorporated by reference herein. Additional details regarding I2RS are found in "Interface to the Routing System Framework," Network Working Group, Internet-draft, Jul. 30, 2012, which is incorporated by reference as if fully set forth herein.

FIB configuration module 252 may add, change (i.e., implicit add), or delete forwarding table entries in accordance with information received from path computation module 186. A FIB configuration message from path computation module 186 to FIB configuration module 252 may specify an event type (add or delete); a node identifier; a path identifier; one or more forwarding table entries each including an ingress port index, ingress label, egress port index, and egress label; and a detour path specifying a path identifier and CoS mode.

Policer configuration module 254 may be invoked by path computation module 186 to request a policer be installed on a particular aggregation node or access node for a particular LSP ingress. As noted above, the FIBs for aggregation nodes or access nodes include policers at LSP ingress. Policer configuration module 254 may receive policer configuration requests according to CCP. A CCP policer configuration request message may specify an event type (add, change, or delete); a node identifier; an LSP identifier; and, for each class of service, a list of policer information including CoS value, maximum bandwidth, burst, and drop/remark. FIB configuration module 252 configures the policers in accordance with the policer configuration requests.

CoS scheduler configuration module 256 may be invoked by path computation module 186 to request configuration of CoS on the aggregation nodes or access nodes. CoS scheduler configuration module 256 may receive the CoS scheduler configuration information. A scheduling configuration request message may specify an event type (change); a node identifier; a port identity value (port index); and configuration information specifying bandwidth, queue depth, and scheduling discipline, for instance.

In accordance with techniques of the disclosure, a customer may wish to configure a service in a service provider network. The customer may interact with service provider system 24 to provide one or more parameters that define the service requested by the customer. Service provider system 24 invokes interface 20 of northbound API 150 to provide controller 140 with a definition of the service requested by the customer, including attribute:value pairs that correspond to parameters provided by the user to request the service.

Depending on the control model for controller 140, path computation module 186 may provision the network service as requested. Upon receiving the data to provision the network service, path engine 244 obtains a current topology snapshot of the path computation domain in the form of TED 242 and computes, using TED 242, CoS-aware traffic-engineered paths.

If a satisfactory computed path for the requested path exists, path engine 244 provides a path descriptor for the computed path to path manager 248 to establish the path using path provisioning module 218. FIB configuration module 252 programs forwarding information to data planes of aggregation nodes or access nodes of the path computation domain. In some examples, policer configuration module 254 may be invoked by path computation module 186 to request a policer be installed on a particular aggregation node or access node for a particular LSP ingress. In some examples, CoS scheduler configuration module 256 may be invoked by path computation module 186 to request configuration of CoS scheduler on the aggregation nodes or access nodes.

Figure 5:
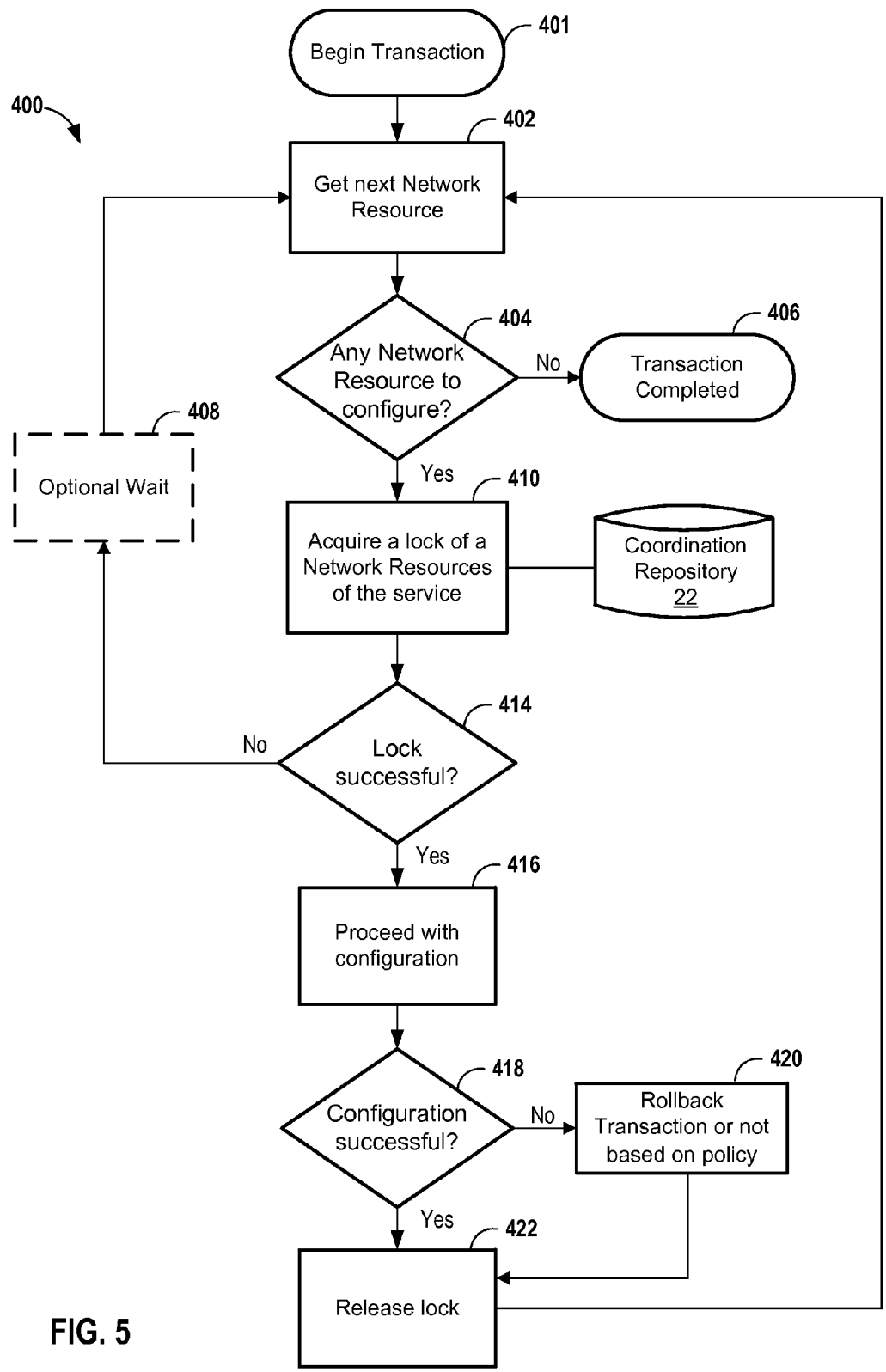
FIG. 5 is a flowchart illustrating an example mode of operation for a controller for provisioning a service using a coordination repository, according to techniques described herein.

Path provisioning module 218 may generate and/or compile resource models that are provided in a modeling language to set the parameters of network devices and network device resources. In some examples, path provisioning module 218 may generate and/or compile resource models using the YANG data modeling language, published as RFC 6020. YANG may be used to model the state of network elements and configuration data. In the example of FIG. 5, path provisioning module 218 may compile any resource models needed to provision the network service into one or more modeling files according to the YANG standard. Upon compiling the one or more modeling files, path provisioning module 218 may execute service provisioning jobs to determine the contents of the one or more data modeling files and provision the requested service. Path provisioning module 218 may translate the YANG-standard formatted message to device-specific and resource-specific configuration information.

Path provisioning module 218 then attempts to configure one or more network resources, which correspond to the device-specific configuration information. Path provisioning module 218 invokes locking unit 110 to obtain locks for the network resources. Upon obtaining the requisite locks, serially or atomically, path provisioning module configures the network resources according to the configuration information. In this way, service provisioning module 26A changes the state of the computed path to safely provision the service with integrity facilitated for the configured network resources.

Figure 4:
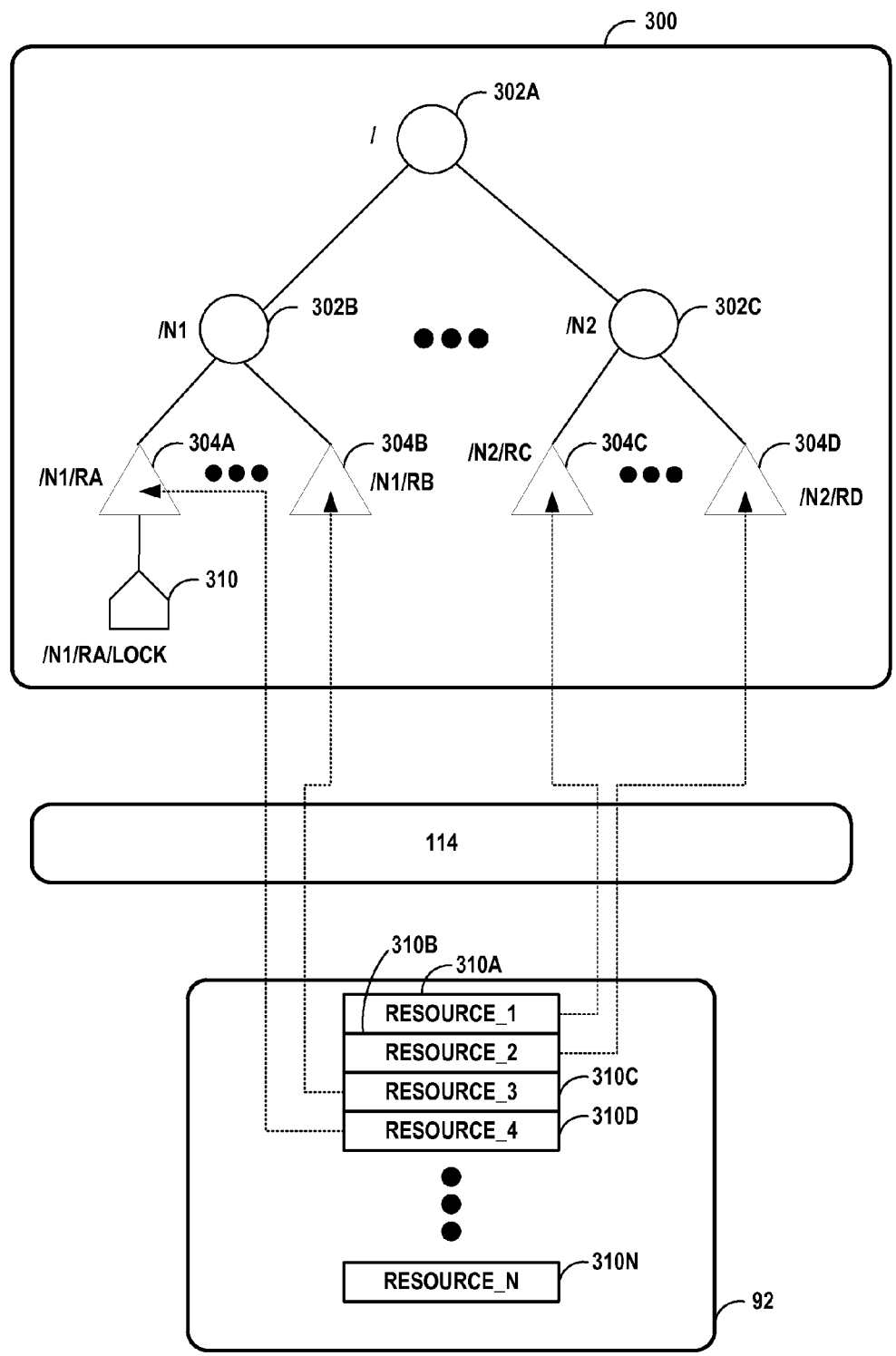
FIG. 4 is a block diagram illustrating example data structures for mapping network resources to respective network-wide synchronous representations of network resources, provided by a coordination repository, to facilitate network-wide synchronous network resource locking according to techniques described in this disclosure.

FIG. 4 is a block diagram illustrating example data structures for mapping network resources to respective network-wide synchronous representations of network resources, provided by a coordination repository, to facilitate network-wide synchronous network resource locking according to techniques described in this disclosure. In this example, network-wide synchronized data structure 300 has a data model and name space organized hierarchically in a manner similar to a file system. Data structure 300 aggregates network resource nodes 304A-304D by network, "N1" and "N2", such that network resource nodes 304A-304B are children of node 302B representing network "N1" and network resource nodes 304C-304D are children of node 302C representing network "N2". Nodes 302B, 302C are children of root node 302A.

Each of network resource nodes 304A-304D (collectively, "resource nodes 304") is a software representation of a corresponding network resource of a network. Technology database 92 stores identifiers 310A-310N for available network resources, which resource map 114 maps to respective software representations. Coordination repository 22, in this example, implements lock using barrier nodes. If a barrier node exists, then a barrier is in place for a barrier condition. In general, distributed systems use barriers to block processing of a set of system nodes until a condition is met, at which time all the system nodes are allowed to proceed processing. Service provisioning modules 26 create and respect barrier nodes in place for a network resource. That is, a service provisioning module 26 that has not been allowed to proceed because a barrier node is in place for a network resource does not attempt to configure the network resource unless and until the service provisioning module 26 obtains the lock represented by a barrier node. In the illustrated example, service provisioning module 26A maps network resource 310D to node 304A using resource map 114. Service provisioning module 26A, after confirming a "LOCK" barrier node for node 304A does not exist, creates the barrier node 310 as a child of node 304A for the network resource "/N1/RA". Service provisioning module 26A thus has the lock for configures the network resource identified by 310D and, after configuring the network resource, releases the lock by deleting barrier node 310. Until service provisioning module 26A deletes barrier node 310, other service provisioning modules 26 refrain from attempting to configure the network resource. Service provisioning module 26A may create barrier node 310 as ephemeral, such that if service provisioning module 26A fails, coordination repository 22 removes barrier node 310 so that other service provisioning modules 26 may obtain the lock for node 304A.

In some examples, coordination repository 22 may use other primitives to implement locking of network resources and thereby operate as a network-wide semaphore repository for network resource configuration. Coordination repository 22 may use ZooKeeper®, for instance, which provides primitives and recipes with which service provisioning modules 26 may implement barriers and other types of locks for network resources.

FIG. 5 is a flowchart illustrating an example mode of operation for a controller for provisioning a service using a coordination repository, according to techniques described herein. Example operation 400 is described with respect to controller 10 and coordination repository 22 of FIG. 1. Controller 10 receives a service request and delegates the transaction to service provisioning module 26A (401). After determining the set of network resources to be configured to complete the transaction, the service provisioning module 26A serially loops through the set of network resources to acquire locks and configure the resources. Looping through the set of network resource (402), service provisioning module 26A determines whether any network resources remain to be configured (404). If not (NO branch of 404, the transaction for the requested service is complete (406).

Otherwise (YES branch of 404), for the next network resource in the loop, service provisioning module 26A attempts to acquire the lock for the network resource from coordination repository 22 (410). In some cases, the lock may be natively provided by the device to be configured, e.g., using a NETCONF configuration lock. If service provisioning module 26A does not successfully acquire the lock (414), service provisioning module 26A may optionally wait for a time (408) and then proceed to the next iteration of the loop (402). If service provisioning module 26A acquires the lock (414), service provisioning module 26A attempts to configure the network resource (416). If the configuration is successful (YES branch of 422), service provisioning module 26A releases the lock and proceeds to the next iteration of the loop (402). If the configuration is not successful (NO branch of 418), service provisioning module 26A may rollback the transaction because the service cannot be configured as computed (420) and release the lock back to coordination repository 22 (422). However, in some cases, the service provisioning module 26A may re-attempt configuration or continue with configuring the other network resources in the set to be configured. This determination may be based on a policy set by the network operation.

Figure 6:
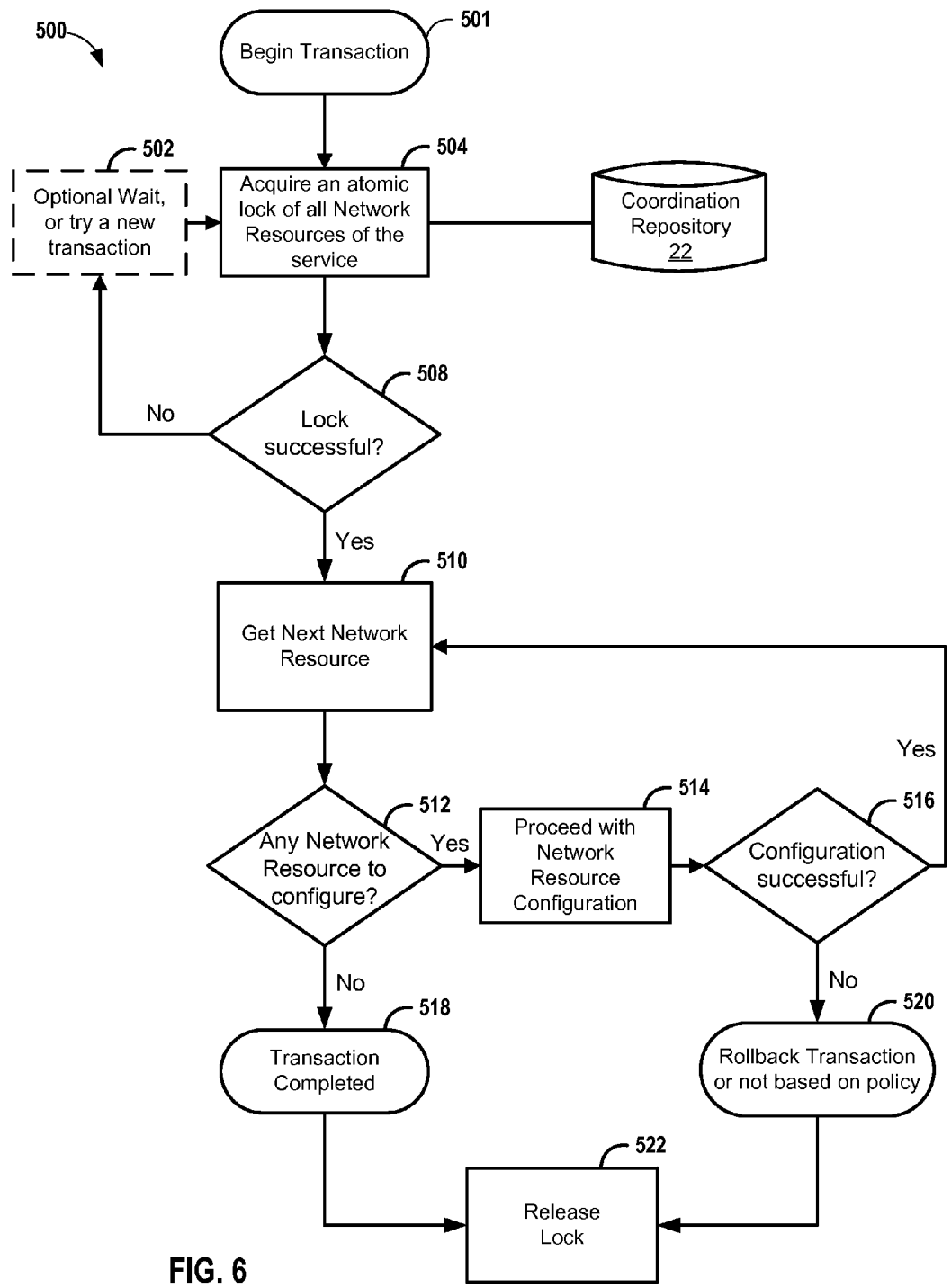
FIG. 6 is a flowchart illustrating an example mode of operation for a controller for provisioning a service using a coordination repository, according to techniques described herein.

FIG. 6 is a flowchart illustrating an example mode of operation for a controller for provisioning a service using a coordination repository, according to techniques described herein. Example operation 500 is described with respect to controller 10 and coordination repository 22 of FIG. 1. Controller 10 receives a service request and delegates the transaction to service provisioning module 26A (501). After determining the set of network resources to be configured to complete the transaction and establish the service, the service provisioning module 26A attempts to atomically obtain a lock for all network resources in the set of network resources (504). As described above, coordination repository 22 may offer barrier nodes for network resource locking Atomically obtaining a lock for the set of network resources means all the barrier nodes are created in an atomic operation—either all of them are created or none of them are created. If unsuccessful (NO branch of 508), service provisioning module 26A may optionally wait for a time (502) and again attempt to atomically obtain the locks (504).

Upon successfully obtaining a lock for the set of network resources (508), service provisioning module 26A iterates through the set of network resources to configure the resources. Looping through the set of network resource (510), service provisioning module 26A determines whether any network resources remain to be configured (512). If not (NO branch of 512), the transaction for the requested service is complete (518) and service provisioning module 26A releases the lock (522).

If a network resource in the set remains to be configured (YES branch of 512), service provisioning module 26A attempts to configure the network resource (514). If the configuration is successful (YES branch of 520), service provisioning module 26A proceeds to the next iteration of the loop (510). If the configuration is not successful (NO branch of 520), service provisioning module 26A may rollback the transaction because the service cannot be configured as computed (520) and release the lock back to coordination repository 22 (522). However, in some cases, the service provisioning module 26A may re-attempt configuration or continue with configuring the other network resources in the set to be configured. This determination may be based on a policy set by the network operation.

For modes of operation 400 and 500, service provisioning modules 26 may, upon failing to acquire a lock, attempt to acquire locks for other network resources in a set of network resources for a service, or for network resources for other services. In other words, service provisioning modules 26 need not sit idle. Operation 400 provides an eventual consistency model, in which at any time some network resources are configured with the service by service provisioning modules 26A while other network resources are not so configured and may be locked by other service provisioning modules 26. In addition, serially locking required network resources typically has a larger locking overhead with coordination repository 22 than atomically acquiring a lock for all required network resources, as is done by operation 500. Further, operation 500 may provide strict service-level transaction integrity and may provide better performance than operation 400 because the lock operation is a single atomic lock acquisition.

In some examples, service provisioning module 26A may spawn threads for multiple routines to configure multiple network resources in parallel, rather than serially iterating through the set of network resources in a single-threaded operation. In some examples, for operation 500, service provisioning module 26A implements the lock at the worker level and not the routine level.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
receiving, by a controller that provisions services for transporting packet flows within a network, a service request that comprises a definition for a service to be provided by the network for a subscriber or a customer of the network;

determining, by the controller, a plurality of network resources of at least one network device to be configured to implement the service in the network and apply the service to the packet-based network traffic of the subscriber or the customer, wherein each network resource of the plurality of network resources is associated with configuration data for the network resource;

storing, by the controller, a database of identifiers for the plurality of network resources, the identifiers mapping to respective software representations in a network-wide coordination repository that stores the respective software representations of the plurality of network resources of the at least one network device;

mapping, by the controller using the database of identifiers, the respective identifiers for the plurality network resources to the respective software representations in the network-wide coordination repository that stores the respective software representations of the plurality of network resources of the at least one network device; and only upon acquiring a lock that defines a lock state for the respective software representations of the plurality of network resources of the at least one network device and by the controller, modifying the configuration data associated with each of the plurality of network resources of the at least one network device to provision the service, wherein the lock for the software representations is acquired from the network-wide coordination repository, and wherein the lock for the software representations provides the controller with exclusive access to each of the plurality of network resources to modify the configuration data associated with each of the plurality of network resources corresponding to the lock.

2. The method of claim 1, wherein acquiring the lock for the plurality of network resources of the at least one network device comprises acquiring a separate lock from the coordination repository for each of the plurality of network resources of the at least one network device, wherein the separate lock for each network resource of the plurality of network resources provides the controller with exclusive access to the network resource to modify the configuration data associated with the network resource corresponding to the separate lock.

3. The method of claim 1, wherein acquiring the lock for the plurality of network resources of the at least one network device comprises atomically acquiring a single lock from the coordination repository for all of the plurality of network resources of the at least one network device, wherein the single lock for the plurality of network resources provides the controller with exclusive access to each of the plurality of network resources to modify the configuration data associated with each of the plurality of network resources corresponding to the single lock.

4. The method of claim 1, wherein the service comprises one of a one of a point-to-point Ethernet service, multipoint-to-multipoint Ethernet service, point-to-multipoint Ethernet service, full-mesh layer 3 virtual private networking (L3VPN) service, and hub-and-spoke L3VPN service.

5. The method of claim 1, wherein the controller comprises a first service provisioning module and a second service provisioning module, the method further comprising:
delegating, by the controller, the service request to the first service provisioning module,
wherein acquiring the lock for the plurality of network resources of the at least one network device comprises acquiring, by the first service provisioning module, the lock for the plurality of network resources of the at least one network device, and wherein the second service provisioning module refrains from configuring any of the plurality of network resources of the at least one network device so long as the first service provisioning module has the lock.

6. The method of claim 1, wherein the controller comprises a first service provisioning module and a second service provisioning module, wherein acquiring the lock for the plurality of network resources of the at least one network device comprises:

creating, by the first service provisioning module, a node in the coordination repository, the node associated with the software representation of a first network resource of the plurality of network resources of the at least one network device, wherein the second service provisioning module refrains from configuring any of the plurality of network resources of the at least one network device while the node exists.

7. The method of claim 6, further comprising:

deleting, by the first service provisioning module, the node in the coordination repository;

acquiring, by the second service provisioning module, a lock for the first network resource by creating the node in the coordination repository.

8. The method of claim 1, wherein acquiring the lock for the plurality of network resources of the at least one network device comprises:

creating, by the controller, a node in the coordination repository, the node associated with the software representation of a first network resource of the plurality of network resources of the at least one network device.

9. The method of claim 8, wherein the node comprises one of a barrier node and an ephemeral barrier node.

10. The method of claim 1, wherein the coordination repository comprises one or more servers that provide a network-wide synchronous network resource locking service by synchronizing the software representation of each of the plurality of network resources of the at least one network device.

11. The method of claim 1, wherein a first network resource of the plurality of network resources comprises one of a network device to be configured and a component of a network device to be configured.

12. A controller that provisions services for transporting packet flows within a network, the controller comprising:

one or more processors coupled to a memory;

a service provisioning module executed by the one or more processors to:

receive a service request that comprises a definition for a service to be provided by the network for a subscriber or a customer of the network;

determine a plurality of network resources of at least one network device to be configured to implement the service in the network and apply the service to the packet-based network traffic of the subscriber or the customer, wherein each network resource of the plurality of network resources is associated with configuration data for the network resource;

store a database of identifiers for the plurality of network resources, the identifiers mapping to respective software representations in a network-wide coordination repository that stores the respective software representations of the plurality of network resources of the at least one network device;

map, using the database of identifiers, the respective identifiers for the plurality network resources to the respective software representations in the network-wide coordination repository that stores the respective software representations of the plurality of network resources of the at least one network device; and a locking unit executed by the one or more processors to acquire a lock for the respective software representations from the network-wide coordination repository, the lock for the respective software representations providing the controller with exclusive access to each of the plurality of network resources to modify the configuration data associated with each of the plurality of network resources corresponding to the lock, wherein the service provisioning module, only upon the locking unit acquiring the lock that defines a lock state for the respective software representations of the plurality of network resources of the at least one network device, is executed by the one or more processors to modify the configuration data associated with each of the plurality of network resources of the at least one network device to provision the service.

13. The controller of claim 12, wherein to acquire the lock for the plurality of network resources of the at least one network device the locking unit acquires a separate lock from the coordination repository for each of the plurality of network resources of the at least one network device, wherein the separate lock for each network resource of the plurality of network resources provides the controller with exclusive access to the network resource to modify the configuration data associated with the network resource corresponding to the separate lock.

14. The controller of claim 12, wherein to acquire the lock for the plurality of network resources of the at least one network device the locking unit atomically acquires a single lock from the coordination repository for all of the plurality of network resources of the at least one network device, wherein the single lock for the plurality of network resources provides the controller with exclusive access to each of the plurality of network resources to modify the configuration data associated with each of the plurality of network resources corresponding to the single lock.

15. The controller of claim 12, wherein the service comprises one of a one of a point-to-point Ethernet service, multipoint-to-multipoint Ethernet service, point-to-multipoint Ethernet service, full-mesh layer 3 virtual private networking (L3VPN) service, and hub-and-spoke L3VPN service.

16. The controller of claim 12, wherein the service provisioning module comprises a first service provisioning module, wherein the controller comprises a second service provisioning module, wherein the controller delegates the service request to the first service provisioning module, and wherein the second service provisioning module refrains from configuring any of the plurality of network resources of the at least one network device so long as the first service provisioning module has the lock.

17. The controller of claim 12, wherein to acquire the lock for the plurality of network resources of the at least one network device the locking unit creates a node in the coordination repository, the node associated with the software representation of a first network resource of the plurality of network resources of the at least one network device.

18. The controller of claim 17, wherein the node comprises one of a barrier node and an ephemeral barrier node.

19. The controller of claim 12, wherein a first network resource of the plurality of network resources comprises one of a network device to be configured and a component of a network device to be configured.

20. A non-transitory computer-readable medium comprising instructions for causing one or more programmable processors to:
receive, by a controller that provisions services for transporting packet flows within a network, a service request that comprises a definition for a service to be provided by the network for a subscriber or a customer of the network;
determine, by the controller, a plurality of network resources of at least one network device to be configured to implement the service in the network and apply the service to the packet-based network traffic of the subscriber or the customer, wherein each network resource of the plurality of network resources is associated with configuration data for the network resource;
store a database of identifiers for the plurality of network resources, the identifiers mapping to respective software representations in a network-wide coordination repository that stores the respective software representations of the plurality of network resources of the at least one network device;
map, using the database of identifiers, the respective identifiers for the plurality network resources to the respective software representations in the network-wide coordination repository that stores the respective software representations of the plurality of network resources of the at least one network device; and
only upon acquiring a lock that defines a lock state for the respective software representations of the plurality of network resources of the at least one network device and by the controller, modify the configuration data associated with each of the plurality of network resources of the at least one network device to provision the service, wherein the lock for the software representations is acquired from the network-wide coordination repository, and wherein the lock for the software representations provides the controller with exclusive access to each of the plurality of network resources to modify the configuration data with each of the plurality of network resources corresponding to the lock.

21. A method comprising:
receiving, by a controller that provisions services for transporting packet flows within a network, a service request that comprises a definition for a service to be provided by the network for a subscriber or a customer of the network;
determining, by the controller, a plurality of network resources of at least one network device to be configured to implement the service in the network and apply the service to the packet-based network traffic of the subscriber or the customer, wherein each network resource of the plurality of network resources is associated with configuration data for the network resource;
storing, by the controller, a database of identifiers for the plurality of network resources, the identifiers mapping to respective software representations in a network-wide coordination repository that stores the respective software representations of the plurality of network resources of the at least one network device;
mapping, by the controller using the database of identifiers, the respective identifiers for the plurality network resources to the respective software representations in the network-wide coordination repository that stores the respective software representations of the plurality of network resources of the at least one network device; and
by the controller for each network resource from the plurality of network resources of the at least one network device:
acquiring a lock that defines a lock state associated with the software representation of the network resource, the software representation for the network resource being stored by the network-wide configuration repository, wherein the lock provides the controller with exclusive access to the network resource to modify the configuration data associated with the network resource corresponding to the lock; and
only in response to acquiring the lock, modifying the configuration data associated with the network resource of the at least one network device to at least partially provision the service.

* * * * *